United States Patent [19]

Ogino et al.

[11] Patent Number: 5,200,854
[45] Date of Patent: Apr. 6, 1993

[54] LARGE-SCREEN PROJECTION-TYPE DISPLAY

[75] Inventors: Masanori Ogino, Yokohama; Yoshiaki Iwahara, Yokosuka; Shuichi Sakamoto; Yukihiro Kobayashi, both of Yokohama, all of Japan

[73] Assignees: Hitachi, Ltd., Tokyo; Hitachi Video & Information System, Inc., Kanagawa, both of Japan

[21] Appl. No.: 838,320

[22] Filed: Feb. 20, 1992

[30] Foreign Application Priority Data

Mar. 27, 1991 [JP] Japan .................................. 3-085852

[51] Int. Cl.⁵ .............................................. G03B 21/56
[52] U.S. Cl. ..................................... 359/451; 359/460
[58] Field of Search ....................... 359/443, 451, 460; 40/603

[56] References Cited

U.S. PATENT DOCUMENTS

| | | | |
|---|---|---|---|
| 3,037,424 | 6/1962 | Capetta | 359/451 |
| 4,406,519 | 9/1983 | Shaw | 359/443 |
| 4,536,056 | 8/1985 | Oguino | 350/128 |
| 4,574,506 | 3/1986 | Morgan | 40/603 |
| 5,011,277 | 4/1991 | Ogino et al. | 353/94 |
| 5,127,722 | 7/1992 | Nishitani | 359/443 |

*Primary Examiner*—Richard A. Wintercorn
*Attorney, Agent, or Firm*—Antonelli, Terry, Stout & Kraus

[57] ABSTRACT

The object of the invention is to provide a large-screen projection-type display using a transmission-type screen, wherein the transmission-type screen is formed of two or more sheets 4, 7, is tilted toward the viewer's side with a small gap kept between the sheets, and is stable relative to the temperature and moisture change of the environment. The front sheet 4 provided on the viewer's side and the Fresnel sheet 7 provided on the projection source side are tilted forward by about 7° toward the viewers. The springs 10 are extended through wires 9 to exert the tension on the front sheet 4 in the vertical direction. At the same time, the springs exert a pressure on the Fresnel sheet 7 in the vertical direction.

10 Claims, 11 Drawing Sheets

$$y = \frac{ch\theta_1 x}{\theta_1}$$

$G = 9.8 \, m/S^2$

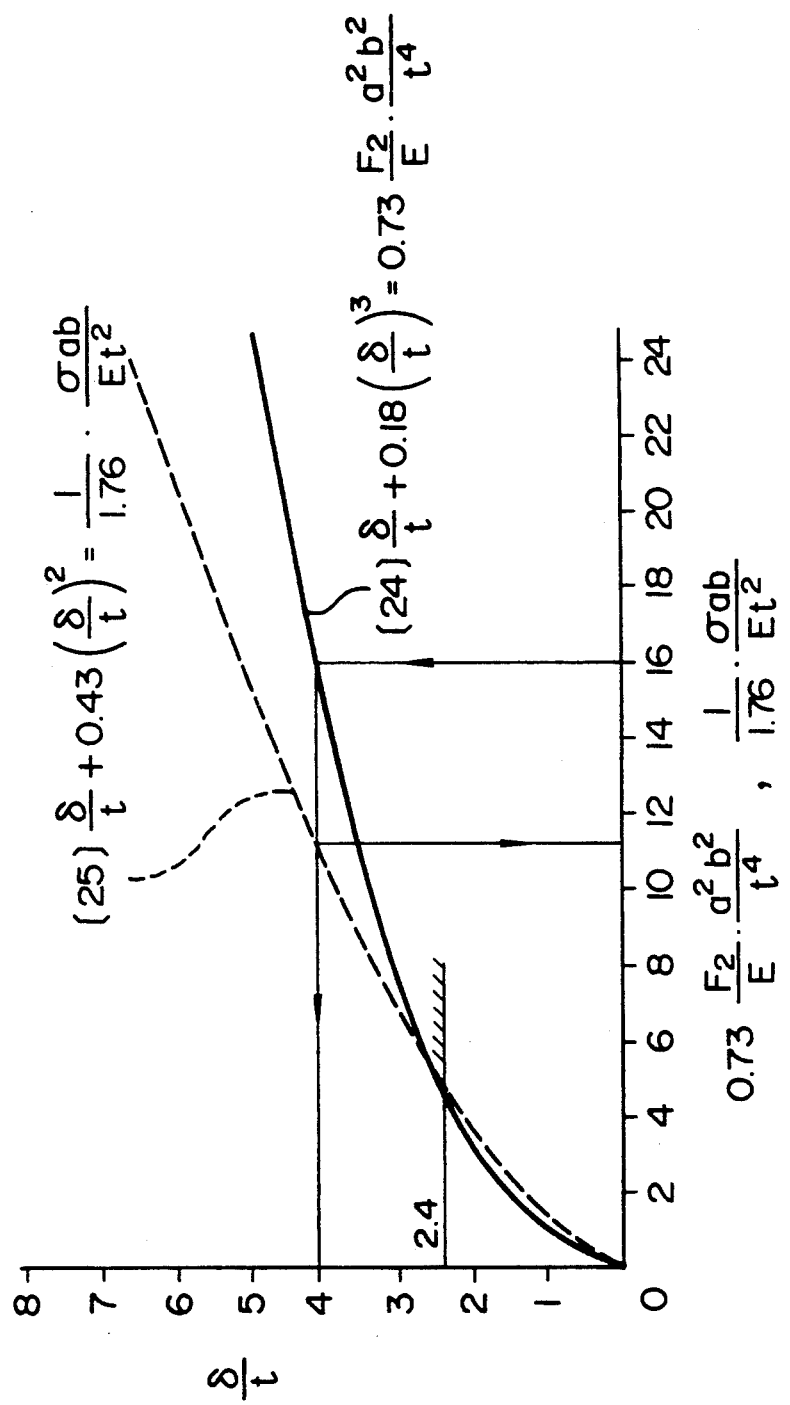
FIG. II

F I G. 17
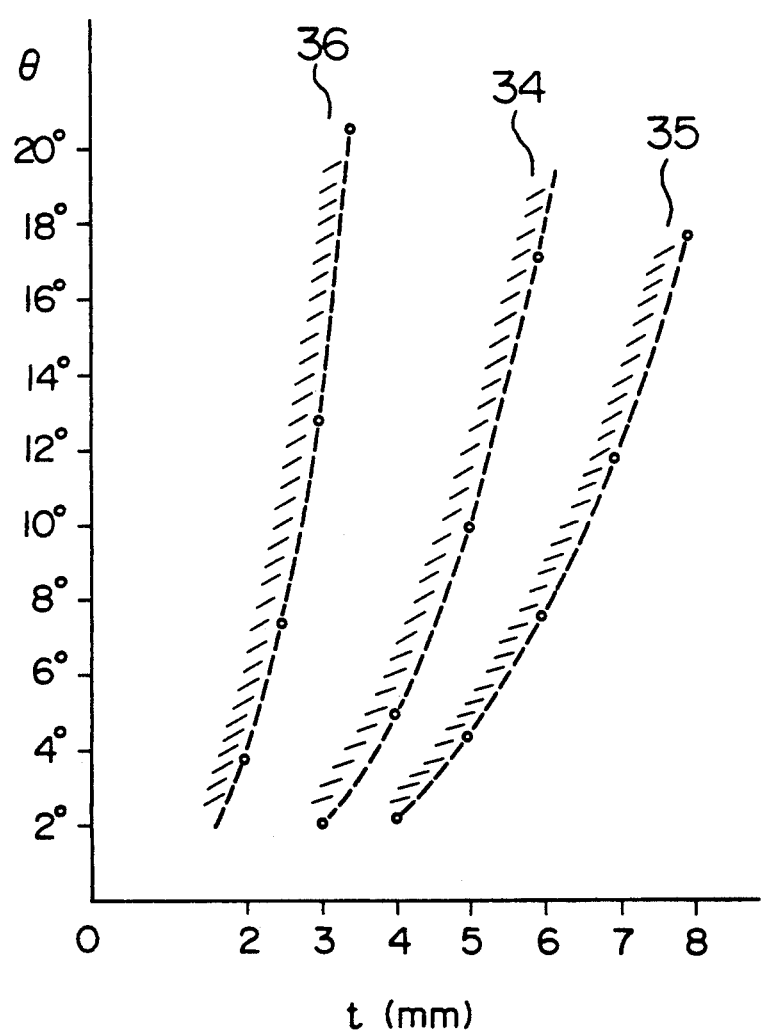

LARGE-SCREEN PROJECTION-TYPE DISPLAY

BACKGROUND OF THE INVENTION

This invention relates to a large-screen projection-type display, and particularly to mounting structure means for a transmission-type screen of about 110-inch diagonal length.

FIG. 1 is a cross-sectional diagram of a conventional projection-type display. In FIG. 1, there are shown a projection source 1 such as a CRT or a liquid crystal panel, a projection lens 2, and a screen 3. In addition, there are shown a front sheet 4 of about 1-mm thickness, and a Fresnel sheet of about 10-mm thickness. This screen is about 110 inches in diagonal length, 2.2 m wide and 1.66 m high, and is made chiefly of an acrylic resin material. This screen is normally mounted on the wall of a hall of about 3-m ceiling height so that the lower end of the screen is located about 1.2 m from the floor. Thus, it is suited to present image information to many people.

The detailed optical construction of this screen is described in U.S. Pat. No.4536056 which our inventors filed.

The conventional projector screen, as shown in FIG. 1, is vertically constructed and mounted and thus has the following drawbacks.

(1) The screen is normally desired to be tilted forward about 7° considering the limited vertical directivity (about ±15°) of the screen, but if it is done so, the front sheet 4 is deformed by its own weight as shown in FIG. 2. Consequently, a large gap is caused between the Fresnel sheet and the front sheet, preventing the image from being focused.

(2) Even when the screen is vertically mounted as shown in FIG. 1, the left side (light-incident surface) and right side (light-exiting surface) of the Fresnel sheet 5 causes a warp $\delta$ by the so-called bimetal effect as shown in FIG. 3 if their temperatures are high and low, respectively.

As a typical example, we now consider the case where the periphery of the screen shown in FIG. 1 is surrounded by an adiabatic wall and half the power of about 1000 W of the projection source 1, or 500 W is radiated to viewers 6 through the screen as shown in FIG. 2. From the formula of thermal conduction, the following equation is derived:

$$500W = \{\sigma \cdot (2200mm) \cdot (1660mm) \cdot \Delta T\}/(10mm) \quad (1)$$

where $\sigma \approx 0.2$ mW/mm · °C. (thermal conductivity)

$\Delta T$ : the temperature difference between the surface and back of the Fresnel sheet 5

∴ $\Delta T = 6.8°$ C.

On the other hand, the linear expansion coefficient ($\alpha$) of acryl is about 70 PPM/° C. and thus the radius of curvature, R of the bimetal Fresnel sheet due to the temperature difference is given by $$R = t/\epsilon = t/(\alpha \Delta T) = (10mm)/(476PPM) \quad (2)$$

where t = 10 mm (thickness)

The relation of the radius of curvature, R to the distortion $\delta_1$ (FIG. 3) is given by $$\delta_1 \approx a^2/(2R) \approx (\alpha \Delta T a^2)/(2t) \quad (3)$$

$$\approx 29mm \quad (4)$$

The value of 29 mm is obtained by substituting 1100 mm (half width of the screen) into a, or the mean radius from the screen center, of the above equation.

In the general CRT projection-type display using three CRTs, in order that the change of color displacement among three colors on the screen is restricted to within about 0.5 pixel, the change of $\delta_1$ is required to be limited to within about 7 mm. Therefore, the prior art has the drawback of causing color displacement due to the change of the temperature difference between the surface and back of the sheet.

The response of the thick Fresnel sheet 5 to the humidity change of the ambient environment is as long as several months, and thus quite stable. However, since the response of the thin front sheet 4 to the humidity change is as short as several days, it has a problem of causing a warp $\delta_2$ as shown in FIG. 3. FIG. 3 shows the case when the Fresnel sheet is vertically mounted.

Moreover, since the thickness of the Fresnel sheet 5 is as large as about 10 mm, the mass of the screen is as large as about 53 kg even except for the screen frame. Therefore, the whole display becomes heavy.

There is another prior art of using a single sheet for constructing the screen. In this case, the screen can be tilted forward about 7°, but regrettably the peripheral corners of the screen are deficient in the relative amount of light.

In addition, there is a conventional two-sheet screen of the type in which the Fresnel sheet 5 is not used, or of the so-called cross renchicur type. In this case, the screen is tilted forward about 7°, and the two sheets are connected by constructional binding means, or with screws, at 10 to 30 places within the screen. However, the screws are seen within the screen, thus deteriorating the external appearance and the picture quality.

Therefore, the transmission-type screen using two or more sheets including at least the Fresnel sheet 5 and the front sheet 4 has been desired to be able to be tilted forward without screws and to sufficiently withstand the change of the environmental temperature and moisture.

SUMMARY OF THE INVENTION

Accordingly, it is an object of the invention to solve the above problems and to provide the technique for building up a transmission type screen capable of forward tilt of about 7°, excellent external appearance, uniformly-high picture quality, strong resistance to the change of environmental temperature and moisture, and light weight.

In order to achieve the above object, according to this invention, the transmission type screen is formed of at least two sheets, or a front sheet on the viewer's side, and a Fresnel sheet on the projection source side of the front sheet. The screen is tilted toward the viewers by 0.04 rad or above to the vertical direction. In addition, the front sheet is tensioned at least in the vertical direction and the Fresnel sheet is warped 2.4 times or above as large as its thickness so that the gap between the front sheet and the Fresnel sheet is restricted to within 7 mm.

Since the front sheet is tensioned at least in the vertical direction, it is prevented from being much warped. Thus, the front sheet and the Fresnel sheet can be kept in intimate contact with each other.

Furthermore, when the transmission-type screen is tilted toward the viewers by 0.04 rad or above to the vertical direction, for example, when the Fresnel sheet is tilted toward the viewers by 7° to the vertical direction, the Fresnel sheet has a warp of about 10 to 20 mm in the natural state. This warp is permissible in the picture quality. In this case, the warp is demanded not to change with the change of the environmental temperature and moisture.

This demand is satisfied by the nonlinear relation of the micro distortion of an elastic plate due to the surface/back expansion or compression difference and the resulting macro spherical deformation. This relation has been discovered by this inventor.

BRIEF DESCRIPTION OF THE DRAWINGS

FIG. 11 is a graph showing the relation of the equations (24) and (25).

FIG. 17 is a graph of the region within which this invention can be applied, relative to the diagonal length of the screen.

DESCRIPTION OF THE PREFERRED EMBODIMENTS OF THE INVENTION

Figure 4A:
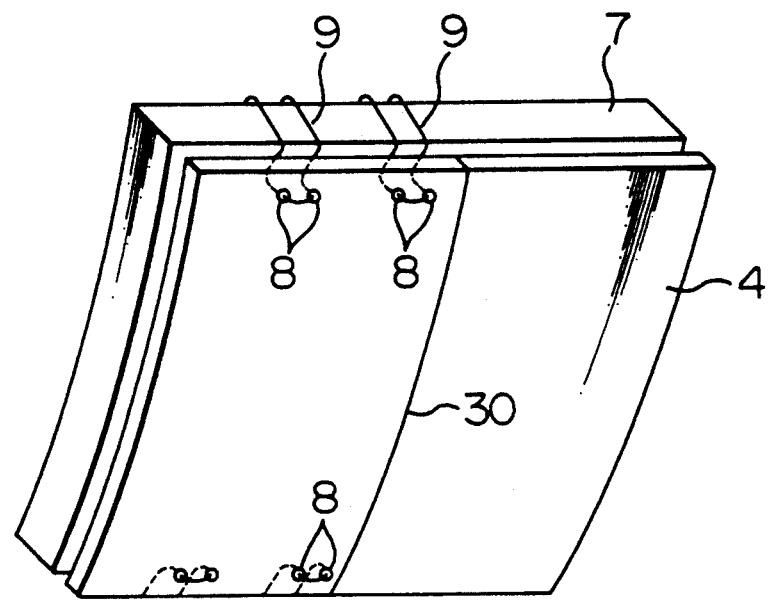
FIGS. 4A and 4B are schematic perspective views of the front sheet and Fresnel sheet of one embodiment of the invention.
Figure 4B:
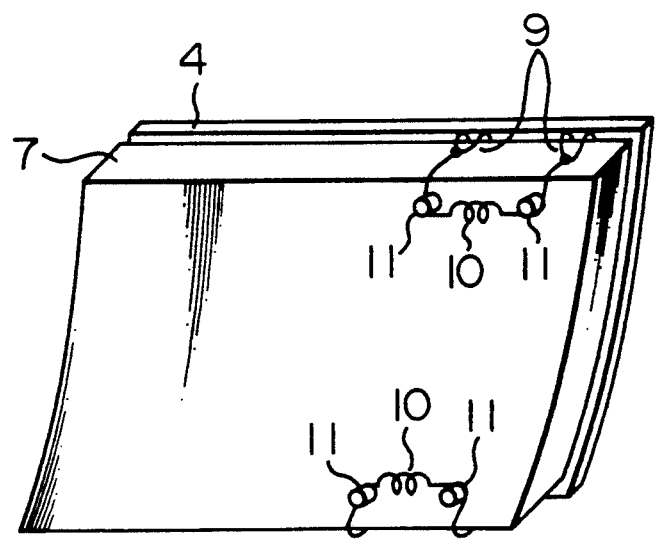

One embodiment of a screen of the invention will be described with reference to FIG. 4. FIG. 4A is a perspective view of the screen which is looked from the viewer side, and FIG. 4B is a perspective view of the screen which is looked from the back. The frame of the screen will be mentioned later with reference to a separate drawing.

In FIGS. 4A and 4B, there is shown the front sheet 4 of about 1 mm in thickness, of which the effective screen size is 2.2 m wide and 1.66 m high. Shown at 7 is a Fresnel sheet of about 3 mm in thickness. This Fresnel sheet is thus much lighter than the conventional 10-mm thick one.

Shown at 8 are small holes of about 0.6 to 1 mm $\phi$ which are bored in the front sheet 4 along the upper and lower side edges. Shown at 9 are wires of about 0.3 to 0.8 mm in thickness which are able to withstand a tension of about 0.6 kgG (G is the acceleration of gravity), for example, stainless steel wire Shown at 10 is springs of 0.6 kgG in tension and of about 10 mm or above in stroke. Also, there are shown small posts 11 which are implanted in the back of the Fresnel sheet 7 and which are about 5 mm high and about 2 mm in diameter. The small posts are used to support the wires 9 which cross over the side edges of the Fresnel sheet. The small posts 11 and the springs 10 are mounted on the outside of the effective area of the screen so as not to shut out the effective projection light.

Although only one of the springs 10 is shown on one side of screen in FIG. 4B, a large number of springs 10 are actually mounted thereon. As will be described later, the total tension of the springs 10 is set to about 6 kgG/m. Therefore, if the tension of each of the springs 10 is selected to be 0.6 kgG, the total tension of each of the springs is 1.2 kgG between the 15 opposite ends, and hence 5 springs 10 per meter are arranged on one side.

In addition, in FIG. 4A there is shown a junction 30 of parts of the front sheet 4. This junction will be described in the fourth embodiment.

The construction of the screen has been mentioned above with reference to FIGS. 4A and 4B. The operation thereof will be described in a qualitative manner.

The tension of the springs 10 serves to expand the front sheet 4 in the vertical direction by extending them through the wires 9 and the holes 8 and thereby to reduce the slack of the front sheet 4. Also, the tension of the springs 10 acts to apply a compressing stress on the Fresnel sheet 7 in the vertical direction by pressing the upper and lower side end surfaces of the Fresnel sheet 7. This compressing force increases the warp of the Fresnel sheet 7. Therefore, the gap between the sheets can be minimized by the synergism of the tension on the front sheet and the compressing stress on the Fresnel sheet 7.

The qualitative explanation has been made above. The quantitative explanation will be made in the following order:

(1) The value of tension necessary for preventing the front sheet 4 from being slack.
(2) The examination about the balance between the dome-accepting energy due to the micro surface/back expansion or compression difference and the macro dome-rejecting energy of the Fresnel sheet 7.
(3) The warp of the Fresnel sheet 7 supported on its four sides by the screen frame.
(4) The quantitative description of the resistance-to-environment performance.

(1) The Value of Tension Necessary for Preventing the Front Sheet 4 from Being Slack For easy understanding of the analysis, an examination will be made of the limit of the front sheet 4 at which the elasticity is lost by secular change. At this limit, the front sheet 4 is degraded into a chain model. Thus, under the 7-degree tilted state, the profile of the front sheet 4 on which a tension is exerted along the upper and lower sides becomes a part of the so-called catenary.

Figure 5:
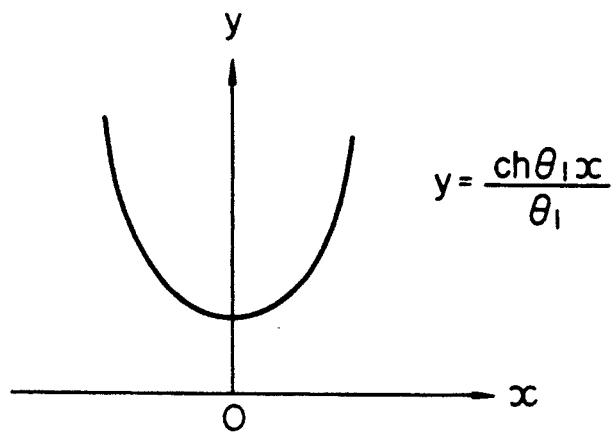
FIG. 5 is a graph of the shape of a catenary as the profile of the front sheet shown in FIG. 4A.

FIG. 5 shows the shape and equation of the catenary. In the equation, $\theta_1$ is the constant which is determined by the density of the front sheet 4 and the applied tension.

Figure 6:
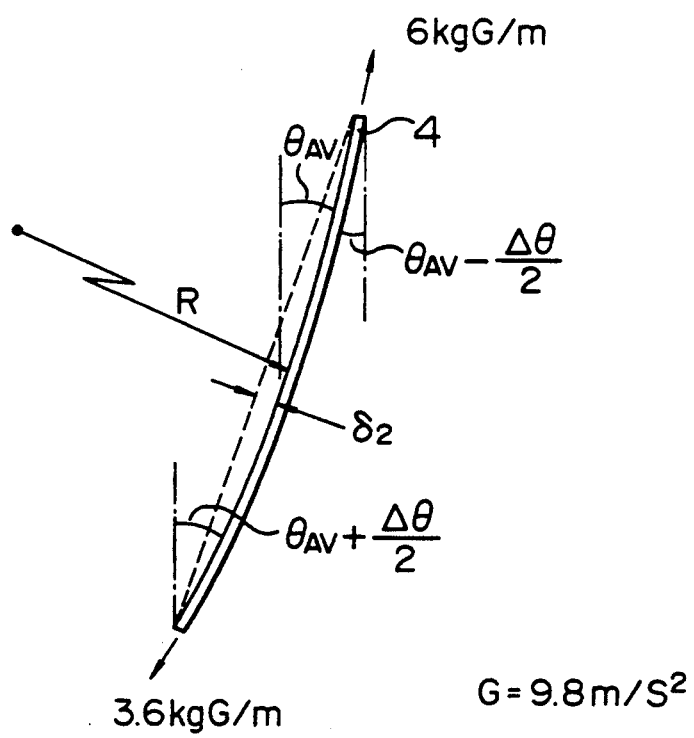
FIG. 6 is a diagram useful for explaining the value of the tension necessary for the front sheet.

FIG. 6 is a cross-sectional diagram of the tilted front sheet 4. In this figure, $\theta_{AV}$ is the mean forward tilt angle, and is about 7° (0.12 rad). In order to make the appearance good-looking, and minimize the gap between the Fresnel sheet 7 and the front sheet 4, it is desired that the value of $\Delta\theta$ in FIG. 6 be selected to be about half that of $\theta_{AV}$. To this end, the following equation is required from the balance of forces.

$$W_1 = (\theta_{AV}/\Delta\theta)\rho Gtl \geq 2\rho Gtl \quad (5)$$
$$\approx 4.8 \text{ kgG/m}$$

where
$W_1$ : the tension per unit length
$\rho$ : the density (1.2 g/(cm)$^3$)
$G$ : the acceleration of gravity
$t$ : the thickness (1 mm)
$l$ : the length (1660 mm)

Also, considering the weight of the front sheet 4 itself, the necessary tension is as indicated in FIG. 6.

In addition, in that case, the value of the occurring warp $\delta_2$ is as follows, together with the radius of curvature, R.

$$R = 1/\Delta\theta = (1660 \text{ mm})/(0.06 \text{ rad}) \quad (6a)$$
$$\approx 28 \text{ m}$$
$$\delta_2 \approx (l/2)^2/(2R) \approx 12 \text{ mm} \quad (6b)$$

The warp of this front sheet 4 is compared with that of the Fresnel sheet 7 in the equation (26) which will be given later. The requirement is that the gap between the sheets be kept to be about 7 mm or below.

(2) The Examination about the Balance between the Dome-Accepting Energy Due to the Micro Surface/Back Expansion or Compression Difference and the Macro Dome-Rejecting Energy of the Fresnel Sheet 7 (this item is the principle of the nonlinear region discovered by this inventor)

For simplicity, we assume the Fresnel sheet to have a disk-like shape that is 1 m in radius ($R_1$) and 3 mm in thickness (t). Moreover, the surface/back expansion or compression difference $\epsilon_0$ is assumed to be about 1000 PPM (0.1%) due to the surface/back moisture or temperature difference.

Figure 7:
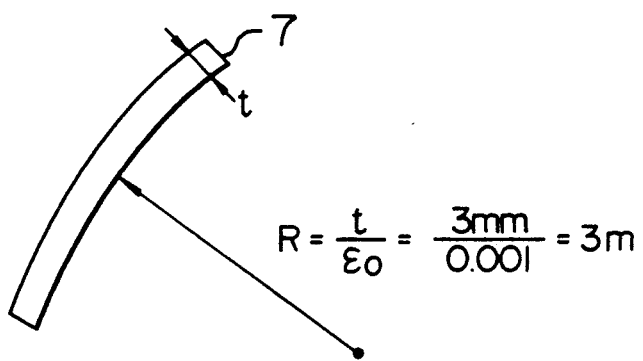
FIG. 7 is a diagram useful for explaining the deformation due to the surface/back compression difference of the Fresnel sheet shown in FIG. 4A with the macro sphere-rejection energy neglected.

If the macro dome-rejecting energy were neglected, the Fresnel sheet 7 would have a spherical surface of 3-m radius of curvature on the basis of the principle shown in FIG. 7, because the distortion energy due to the surface/back expansion or compression difference is released.

However, the macro dome-rejecting energy rejects such deformation. Thus, the mean radius of curvature, k of the curved surface resulting from the compromise or balance, or the radius of curvature, k of the spherical surface is desired to be found.

First the micro dome-accepting energy $E_1$ due to the surface/back expansion or compression difference is found, second the macro dome-rejecting energy $E_2$ due to the spherical deformation is found, and finally the value of radius of curvature, k is found from the k-dependency of $E_1$ and $E_2$.

Figure 8:
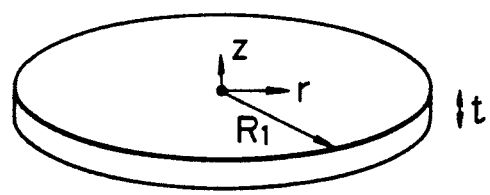
FIG. 8 is a perspective view of a Fresnel disk as an imaginary model.

The micro dome-accepting energy $E_1$ can be found from the following equation, where E is the Young's modulus. As shown in FIG. 8, a circular cylindrical coordinates system is employed, where z is the thickness direction, and r is the radius direction. The origin is at the center of the Fresnel disk.

$$\frac{E_1}{E} = \int_{-0.5t}^{+0.5t} \epsilon^2 dz \int_0^{\pi(R_1)^2} d(\pi r^2) \quad (7)$$

$$\epsilon = (z/t)c \quad (8)$$
$$c = \epsilon_0 - kt \quad (9)$$
$$\therefore E_1/E = (c^2/12)t\pi R_1^2 \quad (10)$$
$$= \{(\epsilon_0 - kt)^2/12\}t\pi R_1^2$$

As already described, $E_1$ for $k = \epsilon_0/t$ is 0.

Then, the macro dome-rejecting energy $E_2$ will be found.

Figure 9:
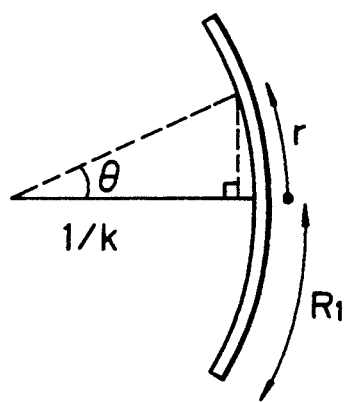
FIG. 9 is a cross-sectional diagram of the Fresnel disk showing the macro spherical deformation.

FIG. 9 is a cross-sectional diagram of the macro spherical deformation of the Fresnel disk. Two means can be considered for the macro spherical deformation. One is the compression of the peripheral portion of the Fresnel disk in the circumferential direction (in the direction perpendicular to the radius r). The other one is the expansion of the peripheral portion in the radius-r direction.

The necessary compression ratio, $-\epsilon_1$ along the circumferential direction in the first means is given as $$-\epsilon_1 = 1 - (\sin\theta)/\theta \approx \theta^2/6 = (kr)^2/6 \quad (11)$$

On the other hand, the necessary expansion ratio, $\epsilon_2$ along the radius direction in the second means is given as $$\epsilon_2 = 1 - \cos\theta \approx \theta^2/2 = (kr)^2/2 \quad (12)$$

According to the principle of the total energy minimization, the first means and second means are deduced to be equally allocated as follows.

$$-\epsilon_1 \rightarrow \{(kr)^2/6\} \times (\tfrac{3}{4}) = (kr)^2/8 \quad (13a)$$

$$\epsilon_2 \rightarrow \{(kr)^2/2\} \times (\tfrac{1}{4}) = (kr)^2/8 \quad (13b)$$

Thus, the macro dome-rejecting energy per unit volume is given by $$\{E/(1+P)\} \cdot \{(kr)^2/8\}^2 \quad (14)$$

where P is the Poisson ratio, and is about 0.4 when the Fresnel sheet is made of an acrylic resin. Thus, the total rejecting energy $E_2$ is expressed as $$E_2/E = \int\int\{(kr)^4/(1.4 \times 64)\}dzd(\pi r^2) \quad (15)$$
$$= (k^4 t\pi R_1^6)/269$$

Therefore, the total energy $E_t$ is derived from the equations (10) and (15) as $$E_t/E = (E_1 + E_2)/E = \{(\epsilon_0 - kt)^2/12\}t\pi R_1^2 + (k^4 t\pi R_1^6/269) \quad (16)$$

The desired value of k can be obtained by differentiating the equation (16) with respect to k and equating it to 0. In other words, that value is the point of balance between the micro dome-acceptance and the macro dome-rejection. The result is as follows.

$$(kt)/\epsilon_0 + \{(kt)/\epsilon_0\}^3 \cdot \{(0.09\epsilon_0^2 R_1^4)/t^4\} = 1 \quad (b\ 17)$$

$$\therefore (kt)/\epsilon_0 \approx 1 \ldots \text{for}\{(0.09\epsilon_0^2 R_1^4)/t^4\} = I < 1 \quad (18a)$$

$$(kt)/\epsilon_0 \approx (1/I)^{\frac{1}{3}} \ldots \text{for } I > 1 \quad (18b)$$

where
k: the radius of curvature (reciprocal of radius)
$\epsilon_0$: the surface/back expansion or compression difference
t: the thickness
$R_1$: the radius of the Fresnel disk
$\epsilon_0/t$: the micro dome-acceptance curvature
I: the macro dome-rejecting factor $(0.09\epsilon_0^2 R_1^4/t^4)$
If $t = 3$ mm, $\epsilon_0 = 1000$ PPM, and $R_1 = 1$ m, then $$t/\epsilon_0 = 3 \text{ m}$$
$$I = \{0.09 \cdot (0.001)^2 \cdot (1000 \text{ mm})^4\}/(3 \text{ mm})^4 = 1111 \quad 1$$
$$\therefore 1/k \approx (3 \text{ m}) \cdot (1111)^{\frac{1}{3}}$$
$$\approx 31 \text{ m}$$

The boundary between the equations (18) occurs at $I = 1$, and the condition therefor is as follows.

$$\epsilon_0 = t^2/(0.3\ R_1^2) \quad (19)$$
$$\approx (3 \text{ mm})^2/\{0.3 \cdot (1000 \text{ mm})^2\}$$
$$= 30 \text{ PPM}$$
$$t/\epsilon_0 = (0.3\ R_1^2)/t \quad (20)$$
$$\approx 100 \text{ m}$$

Figure 1:
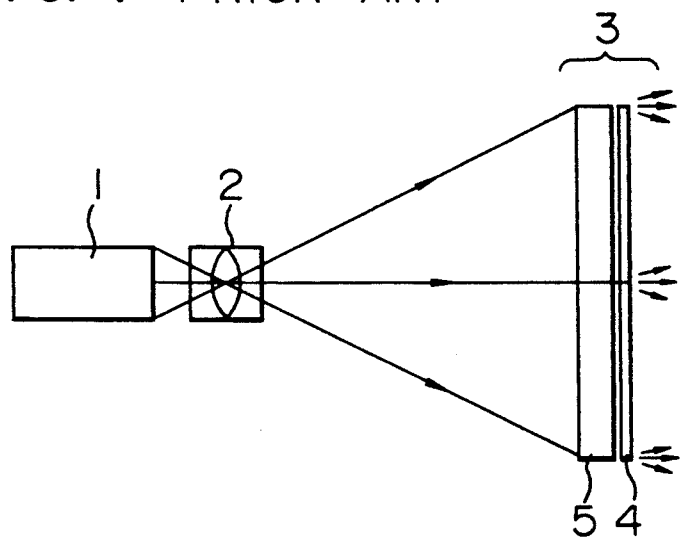
FIG. 1 is a schematic diagram of a conventional a large-screen projection-type display using a transmission-type screen.
Figure 2:
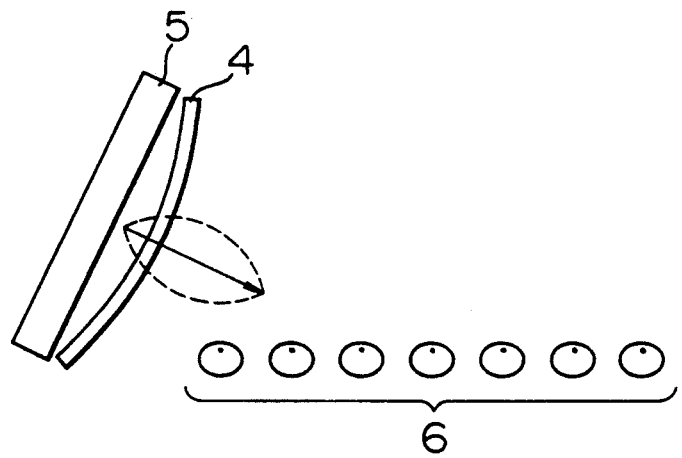
FIG. 2 is a diagram useful for explaining the problem in the prior art shown in FIG. 1.
Figure 3:
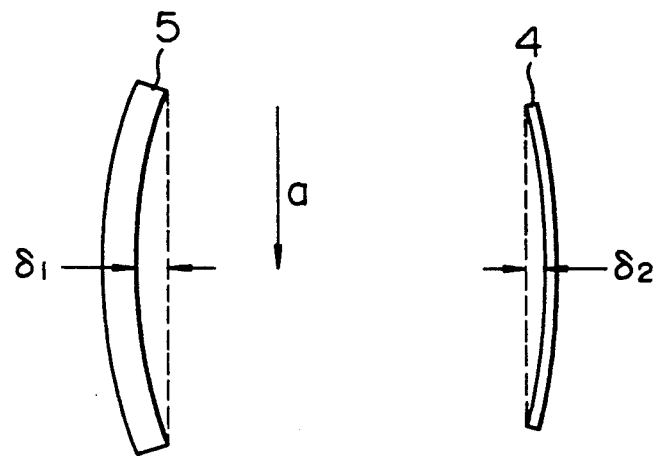
FIG. 3 is a diagram useful for explaining the problem in the prior art shown in FIG. 1.

To show the equation (17) in a graph for easy understanding, our attention should be paid to the following.
The warp $\delta$ in FIG. 3, corresponding to the curvature k is given by the following equation.

$$\delta = (k/2)R_1^2 \quad (21)$$

The following equation is obtained by substituting $\delta$ of the above equation for the variable k of the equation (17).

$$(\delta/t) + 0.36(\delta/t)^3 = (\epsilon_0 R_1^2)/(2t^2) \quad (22)$$

In the equation, the cubic term is the nonlinear term. It should be noticed that the equations (17) and (22) do not include Young's modulus. This is because the micro energy $E_1$ and the macro energy $E_2$ are both proportional to Young's modulus, thus being not concerned in determining the balance. In this case, the coefficient, 0.36 of the equation (22) is inversely proportional to $\{1+P(\text{Poisson ratio})\}$ as will be understood from the deriving process.

Figure 10:
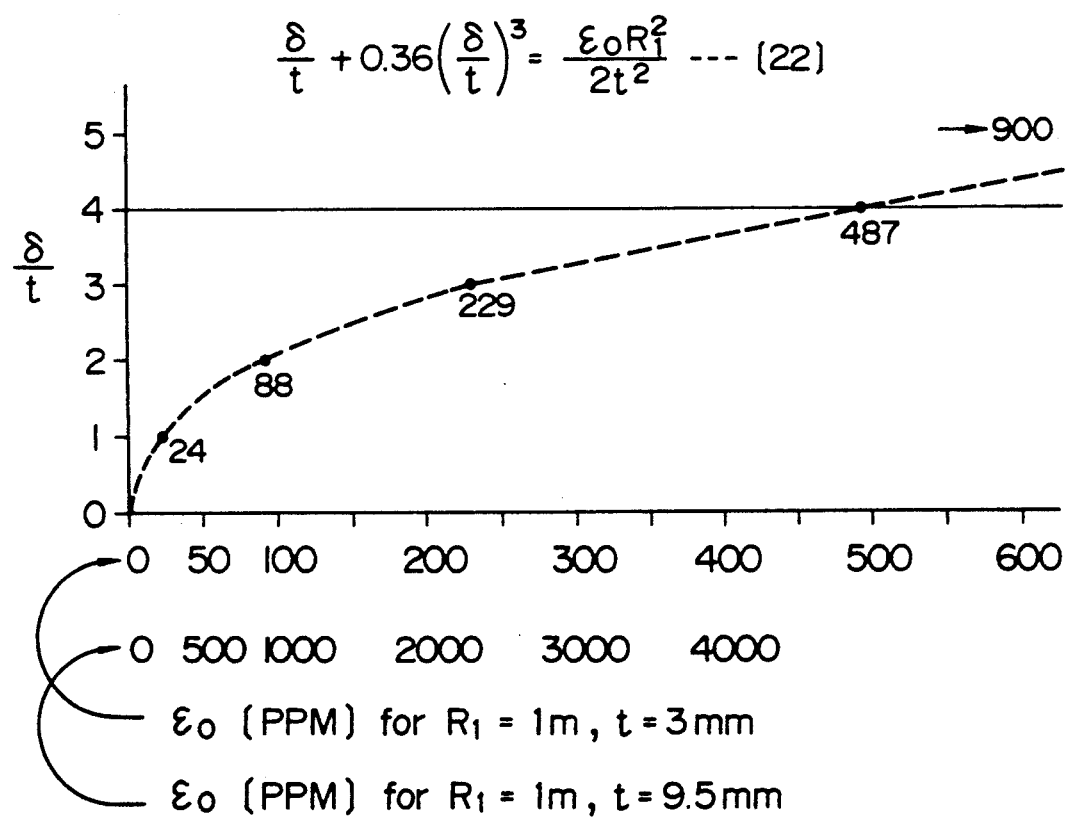
FIG. 10 is a graph showing the relation of the equation (22).

FIG. 10 is a graph of the equation (22).

The equation (3) of the equations (2) and (3) already given in the explanation of the prior art was derived by neglecting the cubic term of nonlinear term in the equation (22). More specifically, the value of $\delta/t$ is found to be about 1.5 from 476 PPM of the equation (2) and the graph of FIG. 10, and therefore the warp is about 15 mm. This value is excessively large as compared with the target value, 7 mm given after the equation (3).

It should be noticed that, as will be understood from FIG. 10, when the Fresnel sheet 7 is previously intentionally warped in the initial state, the change of the amount of warp with respect to the change of the surface/back expansion or compression difference, $\epsilon_0$ due to the environmental change can be restricted to very small values as compared with that in the flat plate. The reason for this is that in FIG. 10 the curve gradient is steep at around the origin (as in the flat plate), but gentle when the $\delta/t$ is three or above.

In other words, in the equation (22), the warp $\delta$ is proportional to the surface/back expansion or compression difference, $\epsilon_0$ when the value of $\delta/t$ is lower than about 1.7, and it is proportional to the cube root of $\epsilon_0$ when the value of $\delta/t$ is higher than about 1.7.

We ends the description of item (2), and will begin the description of item (3).

(3) The Warp of the Fresnel Sheet 7 Supported on its Four Sides by the Screen Frame Normally the following equation is given as the formula of the strength of materials relating to the bending of beam.

$$\delta/t = 0.71(F_2/E) \cdot \{(a^2 b^2)/t^4\} \quad (23)$$

where
$\delta$: the bending
t: the thickness
E: Young's modulus
$F_2$: the pressure
2a: the width
2b: the length The equation is the proportional relation of the pressure and the bending. When the Fresnel sheet 7 of 110-inch diagonal angle, 3-mm thickness is tilted about 0.12 rad forward, the bending, or warp $\delta$ is calculated from the above equation as $$\delta/(3 \text{ mm}) = 0.71\ [\{1.2\ gG/(\text{cm})^3 \times (3 \text{ mm}) \times 0.12 \times \quad (23')$$
$$(1.1 \text{ m})^2 \cdot (0.83 \text{ m})^2\}/\{200 \text{ kg}G/(\text{mm})^2 \times (3 \text{ mm})^4\}] \approx 16$$

$$\therefore \delta = 48 \text{ mm}$$

(0.12 in the above equation indicates the component of force for the forward tilt of 0.12 rad.)

In practice, however, the sheet is not so warped as above. According to the result of an experiment on an acrylic sheet, the following empirical equation is satisfied.

$$\delta/t + 0.18(\delta/t)^3 = 0.73(F_2/E) \cdot \{(a^2 b^2)/t^4\} \quad (24)$$

The maximum stress:

$$\sigma \approx 1.76 E t^2 [\{(\delta/t) + 0.43(\delta/t)^2\}/(ab)] \quad (25)$$

The term, $(\delta/t)^3$ of the equation (24) and the term, $(\delta/t)^2$ of the equation (25) are nonlinear terms. The nonlinear terms are probably caused by the macro dome-rejecting energy previously mentioned in the item (2). However, the analytical derivation thereof has not been made yet by the inventors.

FIG. 11 is a graph of the equations (24) and (25). In FIG. 11, the solid line corresponds to the equation (24), and the broken line to the equation (25). From this graph, the warp $\delta$ can be found by determining the actual value (about 16, see equation (23')) of the right side of the equation (24), and reading the ordinate of the point at which the solid-line curve intersects with 16 of the abscissa in FIG. 11. Therefore, since the value of $\delta/t$ is about 4.0 and $t = 3$ mm, $$\therefore \delta = 4 \times 3 \text{ mm} = 12 \text{ mm} \quad (26)$$

The converted mean radius of curvature $$1/k = R^2/(2\delta) \approx 42m \qquad (26')$$

This value coincides with the value of $\delta_2$ (the warp of the front sheet tensioned according to this invention) mentioned at equation (6). Thus, the gap between the Fresnel sheet 7 and the front sheet 4 can be kept to be the minimum. Also, the maximum stress $\sigma$ on the Fresnel sheet 7 can be obtained by reading the value, 11.2 of the abscissa of the point at which the broken-line curve intersects with 4 of the ordinate in FIG. 11, and calculating as $$11.2 = \{\sigma(1.1m)(0.83m)\}/[1.76\{200kgG/(mm)^2\}(3m-m)^2] \quad \therefore \sigma = 39gG/(mm)^2$$

The acrylic material is generally able to satisfactorily withstand the load of 200 gG/(mm)$^2$ even under a long-term detrimental, environmental condition. According to the general common sense in the prior art, or the equation (23), one has had the apprehension that the Fresnel sheet 7 of 3-mm thickness, when tilted 0.12 rad forward, is initially warped to a large extent and deteriorated more and more with lapse of years. However, as will be understood from the above analysis, it has been made clear that the Fresnel sheet 7 of 3-mm thickness is able to satisfactorily withstand the condition of about 0.12-rad forward tilt.

(4) The Quantitative Description of the Resistance-to-Environment Performance

First, a description will be made of the change of the warp due to the surface/back temperature difference of the 3-mm thickness Fresnel sheet 7. It is assumed that electric power of 500 W is radiated from the screen surface as previously described about the equations (1) to (3) in the prior art.

$\Delta T$ is 2° C. from the condition of 3-mm thickness and the equation (1). Thus, the expansion or compression difference is 140 PPM.

In FIG. 10, the effect of the reduction of $\epsilon_0$ of 140 PPM near $\delta/t = 4$ previously given is read as $$\Delta(\delta/t) \approx -0.5$$

$$\therefore |\Delta\delta| \approx 0.5 \times 3mm = 1.5mm < 7mm$$

In other words, a value within the target value of 7 mm can be achieved.

The change of warp due to moisture will be examined. The possible value of the surface/back expansion or compression difference due to the surface/back moisture absorption difference of the Fresnel sheet 7 will be estimated to be about 300 PPM depending on the environment in which the display is installed. Again, in FIG. 10, the value of $\delta/t$ relative to 300 PPM of abscissa, $\epsilon_0$ is about 1.4. Thus, the warp is about 5 mm within the target value.

As described in items (1) to (4), this invention is able to greatly reduce the weight (up to about ½ or below), increase the resistance to the environment and tilt the screen by 0.12 rad forward for the viewers to watch with ease.

Figure 12A:
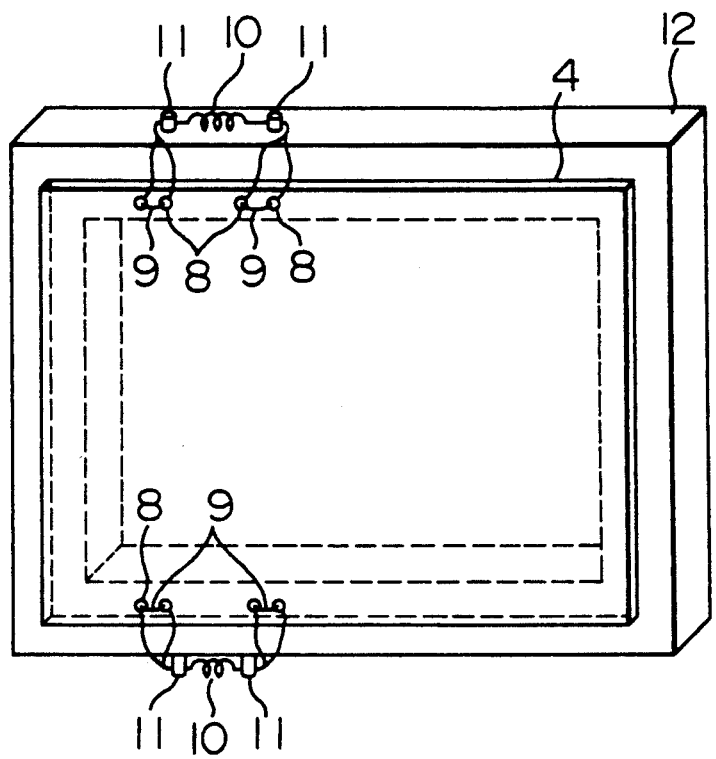
FIG. 12A and 12B are schematic perspective views of the front sheet and Fresnel sheet of the second embodiment of the invention.

FIG. 12 shows the second embodiment of the invention. FIG. 12A shows the front sheet 4 mounted in the front frame 12. In this figure, the elements 8, 9, 10 and 11 are the same as in FIGS. 4A and 4B. The front frame 12 is made of metal (about 3 mm thick) or plastic (about 8 mm thick). The width of the frame is about 30 mm.

Figure 12B:
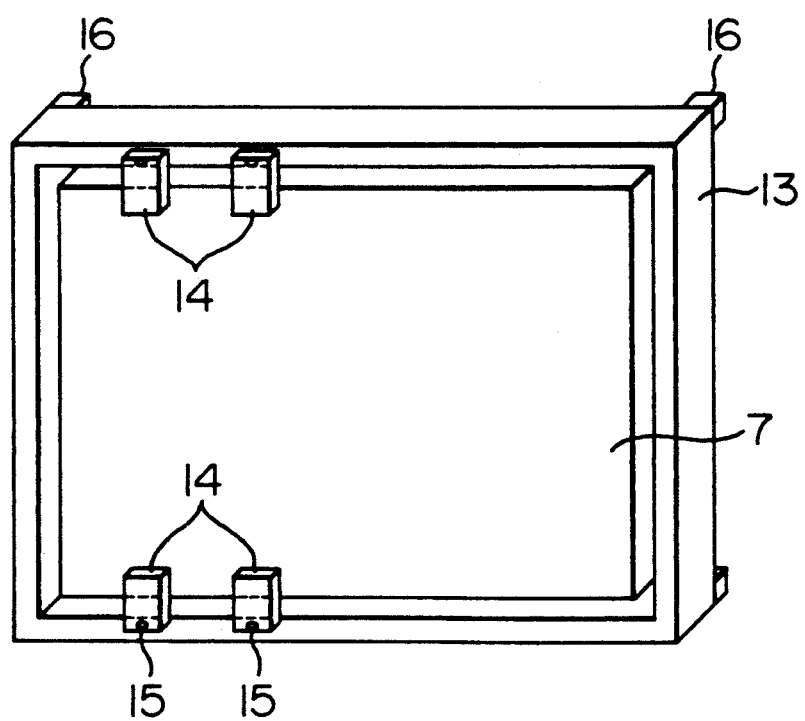

FIG. 12B shows the Fresnel sheet 7 and the back frame 13. These are superimposed on the construction shown in FIG. 12A. In FIG. 12B, there are shown metallic setting parts 14 of about 2-mm thickness for securely holding the Fresnel sheet 7. About five parts 14 are provided on each of both upper side and lower side, though not shown. There are also shown screws 15 for fixing the metallic setting parts 14 on the back frame 13-side, and projections 16 of about 1-mm length for preventing the wires 9 from being pinched between the back frame 13 and the front frame 12.

The back frame 13 is fixed to the front frame 12 with a plurality of other screw means not shown. The back frame 13 is made of metal or plastic and has a thickness of about 4 mm which corresponds to the sum of the 3-mm thickness of the Fresnel sheet and the 1-mm thickness of the front sheet.

In this second embodiment, a great number of springs 10 are provided and the tension in each of the springs is set to about 6 kgG/m as in the first embodiment. The whole screen is tilted forward by about 0.12 rad.

We end the description of the second embodiment.

Figure 13:
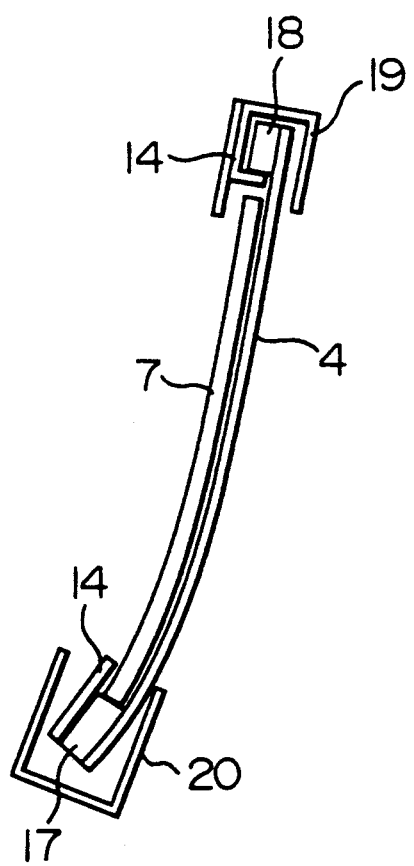
FIG. 13 is a schematic cross-sectional diagram of the front sheet and Fresnel sheet of the third embodiment of the invention.

FIG. 13 is a cross-sectional diagram of the central portion of the screen according to the third embodiment.

Referring to FIG. 13, there are shown the front sheet 4 of 1-mm thickness, the Fresnel sheet 7 of 3-mm thickness, and a shelf member for holding the weight of the Fresnel sheet 7. This shelf member is fixed to the lower end of the front sheet 4 with screws or an adhesive. The thickness of the shelf member is 4 mm, or slightly larger than that of the Fresnel sheet and the height thereof is about 10 mm. This self member is made of metal or plastic. Shown at 14 are the same metallic setting parts as in FIG. 12B.

There is also shown a shelf member for hanging the front sheet 4 and Fresnel sheet 7, or holding the total weight thereof, which member is similar to the frame member 17. Shown at 19 is a metallic part of about 2-mm thickness for hanging the screen, and at 20 is a screen frame for holding the vertical component force (about 12%) of the weight of the screen tilted forward by about 0.12 rad.

The operation will be mentioned. As described previously, the weight of the Fresnel sheet 7 is transmitted to the shelf member 17, and the shelf member 17 pulls the front sheet 4 downward. The tension $W_1$ per unit length is given by $$W_1 = \rho Gth \qquad (27)$$
$$= 1.2 \text{ g/(cm)}^3 \cdot (3 \text{ mm}) \cdot (1660 \text{ mm})G$$
$$= 6 \text{ kgG/m} \qquad (28)$$

This value just satisfies the condition of tension (4.8 kgG/m or above) necessary for the front sheet 4 as previously calculated from the equation (5).

Therefore, the weight of the Fresnel sheet 7 can be used in place of the springs 10 in the first embodiment. The weight to be supported by the upper shelf member 18 is the addition of the weight of the front sheet to the above value, or is 8.4 kgG/m.

Although the left and right sides are not shown in FIG. 13, another screen frame is provided for uniform appearance.

We end the description of the third embodiment.

Incidentally, the front sheet 4 is normally produced by the extrusion roll molding as described in the U.S. Pat. No. 4,536,056. The roll width of the roll molding machine is normally about 1.4 m.

Therefore, in order to produce the screen of about 2.2-m width as the main object of the invention, it is necessary to join two sheets at the center (, or at the junction 30 shown in FIG. 4A). Usually, the sheets are joined by bonding technique. However, since the thickness is as small as about 1 mm, the bonded portion is easy to break. Thus, it is necessary not to exert the horizontal tension on the front sheet 4.

To avoid the horizontal tension, the horizontal compressing force is necessary to be exerted on the upper and lower ends of the front sheet 4.

Figure 14A:
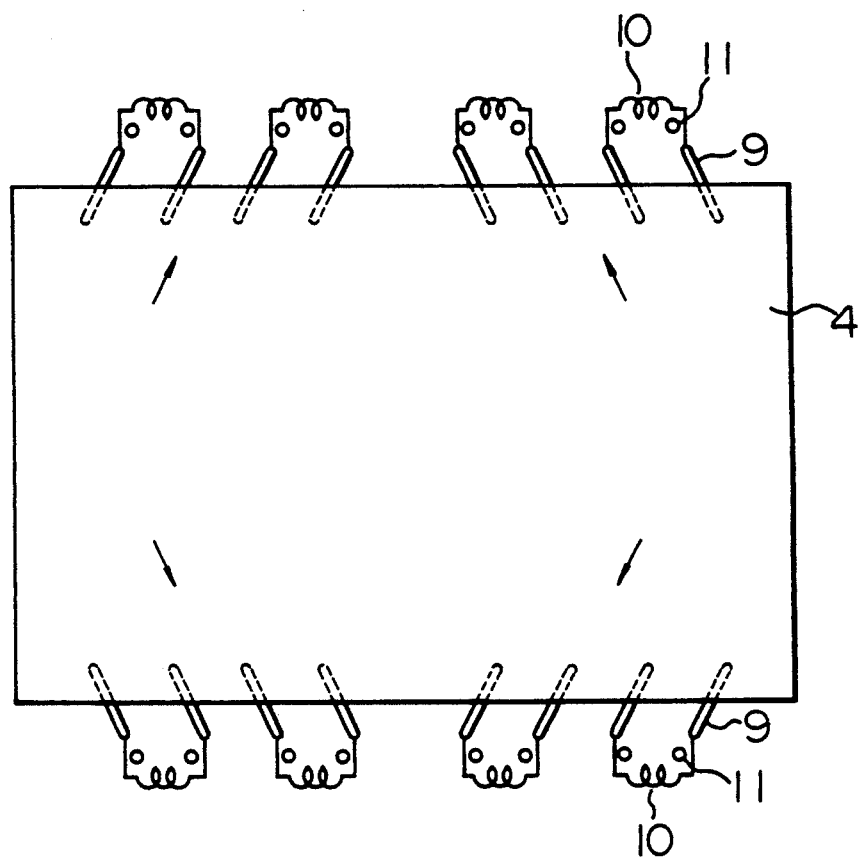
FIGS. 14A and 14B are a schematic front view and side view of the front sheet and Fresnel sheet of the fourth embodiment of the invention.
Figure 14B:
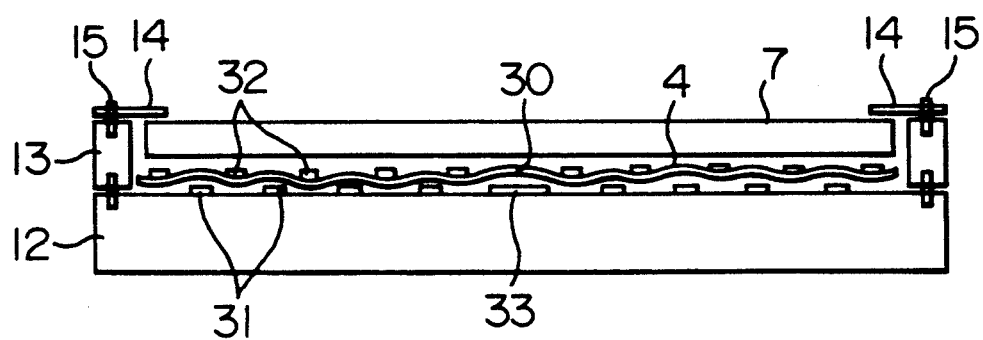

FIGS. 14A and 14B show the ways of exerting the horizontal compressing force as the fourth embodiment. FIG. 14A is the front view of the front sheet 4 shown in FIG. 12A. FIG. 14B is a cross-sectional view of the upper end of the screen. The elements 4, 7, 9, 10, 12, 13, 14, and 15 are the same as in FIGS.12A and 12B. The new elements in this structure are represented by reference numerals 31, 32 and 33. Also, the wires 9 are tilted about 30° inward.

When the wires 9 are tilted about 30°, a compressing force in the left and right direction, or in the horizontal direction is exerted on the front sheet 4 in addition to the above-mentioned tension $W_1$, about 6 kgG/m in the up-and down-direction or in the vertical direction. The mean value, $P_1$ per unit length of the compressing force is given by the following equation.

$$P_1 \approx W_1(\sin 30°) \cdot (a/b) \quad (29)$$
$$\approx (6 \text{ kgG/m}) \times 0.5 \times \{(1.1 \text{ m})/(0.83 \text{ m})\}$$
$$\approx 4 \text{ kgG/m}$$

The element 31 is pieces of guide fixed to the upper end of the front frame 12 by adhesive bonding or with screws. The pieces of guide are about 50 mm wide, 50 mm high and 1.5 mm thick. These guides are provided along the lower end of the front frame 12 at intervals of about 200 mm. Each of these guides is made of plastic. The element 32 is also pieces of guides of substantially the same size as the guides 31. These guides 32 are previously fixed to the front sheet 4 or to the upper and lower ends (see FIG. 12B) of the back frame 13. The element 33 is also a piece of guide of as large as about 150-mm width for protecting the junction 30 of the central portion of the front sheet 4.

Since the thickness t of the front sheet 4 is about 1 mm, the compressing force $P_1$ per unit length expressed by the equation (29) is converted into the means pressure $P_2$ per unit area as expressed by $$P_2 = P_1/t = 4gG/(mm)^2 \quad (30)$$

According to the Euler's formula for buckling, the relation among buckling wavelength $\lambda$, pressure $P_2$ and Young's modulus is given by $$\lambda = 2\pi t\{E/(12P_2)\}^{\frac{1}{2}} \quad (31)$$
$$\approx 2\pi \times (1 \text{ mm}) \cdot [\{200 \text{ kgG/(mm)}^2\}/\{12 \times 4 \text{ gG/(mm)}^2\}]^{\frac{1}{2}}$$
$$\approx 400 \text{ mm} \quad (32)$$

Since the wavelength 400 mm is larger than the arrangement pitch, 200 mm of the guides for buckling guide, the whole screen is never bent. However, the value $P_2$ substituted into the above equation is a means value over the screen height of about 1.66 m. In practice, the pressure is concentrated on the upper end and lower end as will be understood from FIGS. 14A and 14B. Due to this concentration, about five times as large as the value given by the equation (30) is exerted on the upper and lower ends. Therefore, the value according to the equation (32) is about 200 mm or below at the upper and lower ends. Thus, the front sheet 4 is bent at near the upper and lower ends. Consequently, a wave having a wavelength of about 200 mm (arrangement pitch of guides) and a peak-to-peak value of about 1.5 mm can be formed at around the upper and lower ends.

Figure 15:
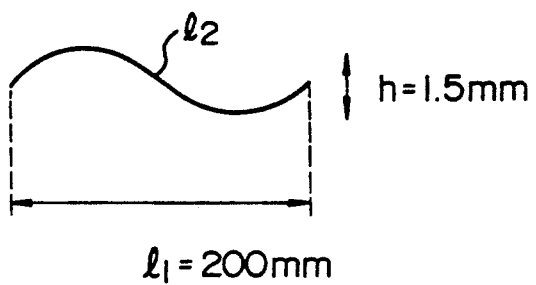
FIG. 15 is a diagram useful for explaining the waveform formed near the upper and lower ends of the front sheet shown in FIG. 14.

FIG. 15 shows one waveform of the wave. In this figure, the period $l_1$ of the wave is 200 mm, $l_2$ is the length of the path of the wave, and h is the height of the wave. The ratio $l_2/l_1$ is given according to the formula for line integral as $$(l_2-l_1)/l_1 \approx (\pi^2/4)\cdot(h/l_1)^2 = 2.5(1.5\cdot200)^2 = 140 PPM \quad (33)$$

Therefore, the buckling compression length $\Delta l$ over the total length of 4.4 m of upper side 2.2 m and lower side 2.2 m is expressed as $$\Delta l = 4.4m \times 140 PPM \approx 0.62mm \quad (34)$$

When this value is divided by the total peripheral length 7.7 m of the screen, the ratio is given by $$(0.62mm)/(7.7m) = 80 PPM \quad (35)$$

On the other hand, substituting the mean radius of curvature $(1/k = 42)$ of the Fresnel sheet 7 of the above-given equation (26') into the equation (11) will yield $$-\epsilon_1 = (kr)^2/6 \rightarrow (kR_1)^2/6$$
$$= \{(1m)/(42m)\}^2 \cdot (1/6) \approx 94 PPM \quad (36)$$

In other words, in order to tactfully fit the front sheet 4 along the convex surface of the tilted Fresnel sheet 7 supported at the four sides, the peripheral portion of the front sheet 4 is compressed by 94 PPM. The equation (35) substantially satisfies this condition.

Thus, in the fourth embodiment, the tension exerted on the junction 30 of the central portion of the front sheet 4 in the right and left direction can be reduced and as a result the reliability is improved or the amount of adhesive at the junction can be reduced.

Figure 16:
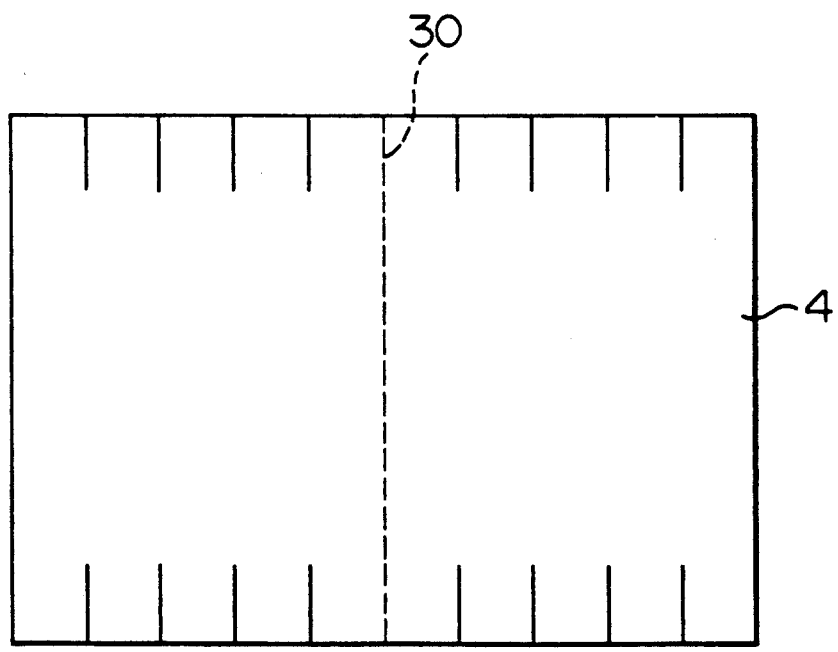
FIG. 16 is a front view of the front sheet of FIG. 14A showing the external appearance.

FIG. 16 shows the appearance of the front sheet 4 in the fourth embodiment. Slight waves of about 1.5 mm are seen on the upper and lower ends, but can be acceptable in the reproduction of picture.

We have disclosed the first to fourth embodiments of the invention as above. Modifications of the embodiments within the scope of the invention will be mentioned below.

In the above embodiments, two sheets are used for the screen. When this invention is applied to a screen formed of three or above sheets, the thickest sheet is regarded as the sheet 7 in this invention.

The sheets other than the sheet 7 and the front sheet 4 are sandwiched between these sheets or provided on the back of the sheet 7. It will be obvious that this invention can also be easily applied to that case.

Various specific values have been given above for the 110-inch size screen tilted forward by about 0.12 rad (about 7°). However, the tilt angle may be an arbitrary value depending on the use. In order to make the invention effective, it is necessary that the nonlinear cube term in the equations (22) and (24) be dominant as compared with the proportional term $\delta/t$.

To achieve this, the value $\delta/t$ is selected to be 1.7 or above according to the equation (22) or 2.4 or above according to the equation (24). The abscissa index corresponding to $\delta/t$, 2.4 or above is 4.9 or above from FIG. 11. Since the abscissa index for 0.12-rad tilt is 16 as described above, the abscissa index, 4.9 or above corresponds to the tilt of about 0.0 4 rad. Therefore, when the 110-inch size screen is tilted forward by 0.0 4 rad or above, the invention can be effectively used.

Accordingly, this invention can be generally applied to the region in which the warp-to-thickness ratio, $\delta/t$ of the Fresnel sheet 7 is 2.4 or above.

This region, considering the convenience for the actual application, is indicated by the shaded area in FIG. 17. In this figure, the abscissa t is the thickness of the Fresnel sheet 7, and the ordinate $\theta$ is the tilt angle. The tilt angle vs. thickness characteristic curve 34 is for the 110-inch size screen, curve 35 is for the 135-inch size screen, and curve 36 is for the 70-inch size screen. These curves can be obtained by the conditions that the value of the right side of the equation (24) is 4.9 or above (corresponding to 2.4 or above of $\delta/t$).

$$0.73(F_2/E) \cdot \{(a^2 b^2)/t^4\} \geq 4.9$$
$F_2 = \rho G t \sin\theta$, $a$: half width, $b$: half height,
$E \approx 200 \text{ kg}G/(\text{mm})^2$, $t$: thickness, $\theta$: forward tilt angle, $\rho \approx 1.2 \text{ g}/(\text{cm})^3$
$$\therefore \sin\theta \geq 1.1 \times (10^9 \text{ mm}) \times \{t^3/(a^2 b^2)\} \quad (37)$$

According to this invention, a large-size high-performance transmission-type screen formed of two or more sheets can be used in a tilted condition and can be improved in the stability to the temperature and moisture change of the ambient environment. Moreover, the weight of the screen can be reduced to about a half of that of the conventional screen. Thus, the value in the industry can be enhanced.

While in the above embodiments two sheet, or Fresnel sheet and front sheet are used, this invention is not limited thereto, but can take other various constructions. For example, one or both of the Fresnel sheet and the front sheet can be formed of, for example, two sheets.

What is claimed is:

1. A large-screen projection-type display using a transmission-type screen, wherein said transmission-type screen is formed of, at least, two sheets, or a first sheet provided on the viewer's side, and a second sheet provided on the projection source side far from said first sheet, both of said sheets are tilted toward the viewers by about 0.04 radian or above relative to the vertical direction, said first sheet is tensioned at least in the vertical direction, said second sheet has a warp of more than about 2.4 times as large as its thickness, and said first sheet and said second sheet are kept spaced about 7 mm or below.

2. A large-screen projection-type display according to claim 1, wherein said first sheet has spring means provided at its upper and lower ends so that said tension is applied by said spring means.

3. A large-screen projection-type display according to claim 1, wherein said first sheet has a shelf member provided at least at the lower end, and said tension in said first sheet is applied by exerting the weight of said second sheet on said shelf member.

4. A large-screen projection-type display according to claim 2, wherein said spring means exert not only said tension on said first sheet but also a pressure in the horizontal direction thereon.

5. A large-screen projection-type display according to claim 2, wherein said spring means exert not only said tension on said first sheet but also a pressure on said second sheet in the vertical direction.

6. A large-screen projection-type display using a transmission-type screen, wherein said transmission-type screen is formed of, at least, two sheets, or a front sheet provided on the viewer's side and a Fresnel sheet provided on the projection source side far from said front sheet, both said sheets are tilted toward the viewers by about 0.04 radian or above relative to the vertical direction, said front sheet is tensioned at least in the vertical direction, said Fresnel sheet has a warp of more than about 2.4 times as large as its thickness, and said front sheet and said Fresnel sheet are kept spaced about 7 mm or below.

7. A large-screen projection-type display according to claim 6, wherein said front sheet has spring means provided at its upper and lower ends so that said tension is applied by said spring means.

8. A large-screen projection-type display according to claim 6, wherein said front sheet has a shelf member at least at its lower end so that said tension in said front sheet is applied by exerting the weight of said Fresnel sheet on said shelf member.

9. A large-screen projection-type display according to claim 7, wherein said spring means exerts not only said tension on said front sheet but also a pressure in the horizontal direction thereon.

10. A large-screen projection-type display according to claim 7, wherein said spring means exerts not only said tension on said front sheet but also a pressure on said Fresnel sheet in the vertical direction.

* * * * *